United States Patent [19]

Thomas et al.

[11] Patent Number: 5,187,480
[45] Date of Patent: Feb. 16, 1993

[54] SYMBOL DEFINITION APPARATUS

[75] Inventors: Ronald H. Thomas, Samford; Helmut Stohr, Alderley, both of Australia

[73] Assignee: Allan Garnham, Queensland, Australia

[21] Appl. No.: 624,801

[22] Filed: Dec. 3, 1990

[30] Foreign Application Priority Data

Sep. 5, 1988 [AU] Australia ............................... PJ0247
Mar. 19, 1990 [AU] Australia ............................... PJ9172
Nov. 19, 1990 [AU] Australia ............................... PK3446

[51] Int. Cl.⁵ .............................................. G06F 3/00
[52] U.S. Cl. ..................................... 341/22; 341/28; 382/13
[58] Field of Search .................... 341/22, 28; 340/748, 340/790; 364/709.12, 709.14, 709.15, 709.16; 382/13, 24, 25

[56] References Cited

FOREIGN PATENT DOCUMENTS

| | | | |
|---|---|---|---|
| 85100868 | 10/1986 | China . | |
| 85108032 | 10/1986 | China . | |
| 0105029 | 6/1982 | Japan | 341/28 |
| 0051329 | 3/1983 | Japan | 341/28 |
| 0052721 | 3/1983 | Japan | 341/28 |
| 74103939 | 3/1986 | Taiwan . | |
| 2076572 | 12/1981 | United Kingdom | 341/28 |
| 2118749 | 3/1983 | United Kingdom . | |
| 2066534 | 7/1987 | United Kingdom . | |
| 2212956 | 8/1989 | United Kingdom | 341/28 |

OTHER PUBLICATIONS

"The Processing of Information in Chinese" by Shui-yin Lo and Zwi Barnes, Jul. 1983, The Australian Journal of Chinese Affairs, No. 10.

Primary Examiner—Donald J. Yusko
Assistant Examiner—Michael Krakovsky
Attorney, Agent, or Firm—Helfgott & Karas

[57] ABSTRACT

In a method and apparatus for assembling text in ideographic language characters, a computer processing apparatus is provided, which comprises a central processing unit to which are connected a program storage unit, a character storage unit, a display unit and a printer. The character storage unit is searched by entering through input entry keys of a keyboard search criteria including the entered ideographic character stroke-type categories and the order in which the character stroke-type categories are entered through the input entry keys, whereby, upon entry of the search criteria, data relevant to the graphic representation of the ideographic character or data relevant to the graphic representations of a plurality of the ideographic characters which meet the search criteria, is retrieved from the program storage unit and the graphic representations are displayed by the display unit.

20 Claims, 13 Drawing Sheets

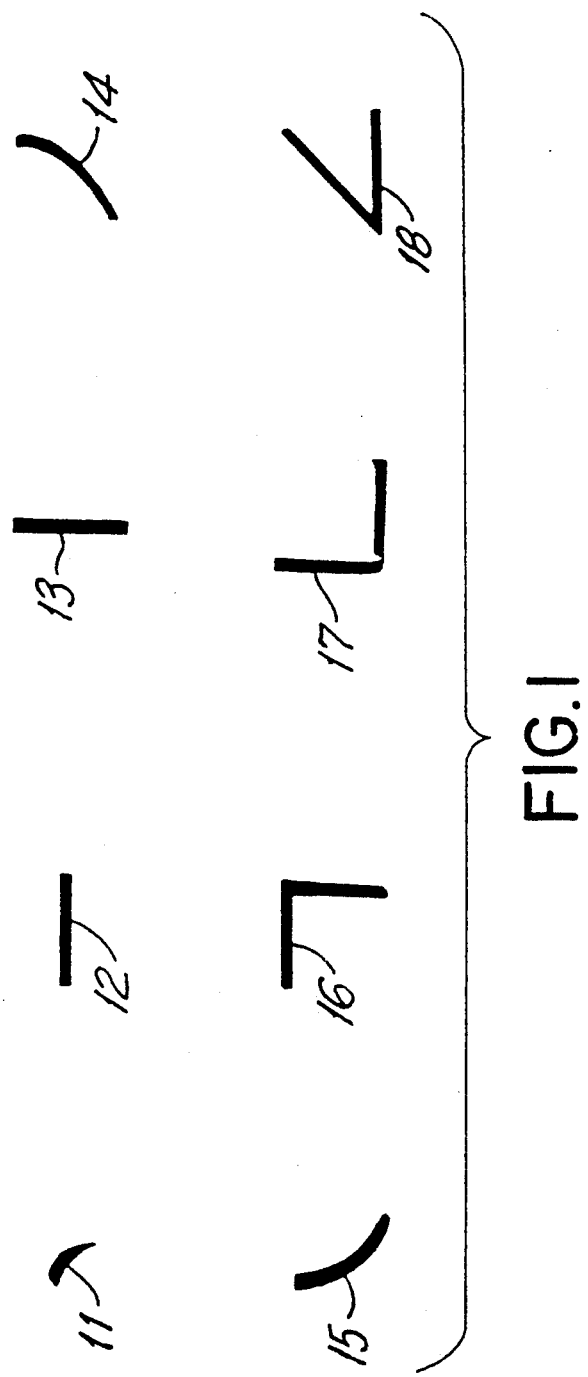

FIG. 4

| 70/80 | 71/81 | 72/82 | 73/83 | 74/84 | 75/85 | 76/86 | 77/87 | 78/88 | 79/89 |
|---|---|---|---|---|---|---|---|---|---|
| ワ/わ wā | ラ/ら la(R) | ヤ/や yā | マ/ま mā | ハ/は hā | ナ/な nā | タ/た tā | サ/さ sā | カ/か kā | ア/あ ā |
| イ/い ēgo | リ/り leē(RE) | イ/い i | ミ/み mēe | ヒ/ひ hē | ニ/に nēe | チ/ち chi | シ/し shē | キ/き kē | イ/い ēgo |
| ウ/う ōops | ル/る lōo(RU) | ユ/ゆ you | ム/む moo | フ/ふ fu | ヌ/ぬ nu | ツ/つ tsu | ス/す sōo | ク/く kōo | ウ/う ōops |
| エ/え ēgg | レ/れ lē(RE) | エ/え e | メ/め mē | ヘ/へ hē | ネ/ね nē | テ/て tē | セ/せ sē | ケ/け kē | エ/え ēgg |
| オ/お ōn | ロ/ろ lō(RO) | ヨ/よ yō | モ/も mō | ホ/ほ hō | ノ/の nō | ト/と tō | ソ/そ sō | コ/こ kō | オ/お ōr |
| ン/ん mn | | | | | | | | | |

60

| 他 | 那 | 時 | 如 |
|---|---|---|---|
| 的 | 及 | 是 | 能 |
| 人 | 又 | 中 | 好 |
| | 也 | | |
| ノ | ㄱ | 一 | ㄑ |

| 他 | 我 | 中 | 好 |
|---|---|---|---|
| 的 | 那 | 是 | 能 |
| 個 | 又 | 時 | 如 |
| 人 | 乙 | 上 | 她 |
| | 也 | 以 | 幾 |
| | | | |
| ノ | ㄱ | 一 | 、 |

FIG.5A

SYMBOL DEFINITION APPARATUS

This application is a continuation-in-part application of co-pending International Application No. PCT/AU 89/00379, having an International Filing Date of Sep. 5, 1989, and now abandoned, and claiming priority of Australian Patent Application PJ 0247, filed Sep. 5, 1988, the PCT application listed the United States, both as a designated and elected country.

BACKGROUND THE INVENTION

This invention relates to a symbol definition apparatus.

This invention has particular but not exclusive application to the redactive processing of symbolic language characters using electronic data processing apparatus, and for illustrative purposes reference will be made to such application. However, it is to be understood that this invention could be used in other applications, such as shorthand, mathematical, musical and other non-language symbols.

The written Chinese language is an example of a symbolic language, rather than an alphabetic language, and contains many thousands of symbols or ideographs, each of which may represent a word. All Chinese characters are formed from or include selected unique sequences of eight basic indicia or "strokes", derived from the actual brush strokes used when creating the characters by hand. Each stroke type is characterized by its shape and direction, and over fifty strokes may be used to form the most complex characters, although most characters can be defined with between six and twenty-one strokes. Each character has a particular stroke count number associated with it, although the official stroke count number can vary from the actual stroke count number in a small number of cases. In order to promote uniformity of character shape for different writers, as well as enhancing fluency, ease of redaction and teaching, strokes are added in sequence to form a character in a particular order which is defined for that character, although the actual stroke order is not apparent in the completed character.

Characters include one or more of a group of two hundred and fourteen basic character portions called "radicals" which are used with additional strokes to form characters with meanings or sounds related to that of the contained radical. Radicals may also be characters.

Because of the necessity to define such a large number of characters for writing in Chinese, the adoption of mechanised writing of Chinese has been slow. For instance, a typical Chinese typesetting machine has one thousand, two hundred keys, compared to approximately one hundred for an alphanumeric typesetter, and consequently is much more costly and difficult to use. It is also unable to type-set many of the rarer characters.

A further problem confronting users and students of the written Chinese language is the difficulty of finding the exact shape and meaning of a character using a dictionary. The primary access mode for a Chinese dictionary is by reference to the official number of strokes for that character. A user must then search the section of the dictionary devoted to characters with that official stroke count number, using the logical radical contained within the character to further sub-divide the search category. Hitherto, it has been impossible to utilise a progressive search strategy of the type which facilitates a search for a word in an alphanumeric dictionary.

Automatic or electronic word processing using Chinese characters presents a similar problem as described above, because hitherto it has been very inconvenient to select and enter the desired characters into the word processor using a keyboard. Some Chinese word processors utilise digitising pads as an input device, and the operators must draw the characters one at a time on the pad. Digitising pads are expensive and require considerable digital processing for the scanned image on the digitising pad to be recognised by the word processor as the character which was intended. Furthermore, the user of the digitiser must be skillful and careful to be consistent in the way that characters are drawn on the digitiser.

One current Chinese word processing technique requires an operator to break a character up mentally into a phoneme or series of phonemes selected from thirty-seven phonemes which are displayed on a keyboard overlay. The phoneme series is entered through the keyboard, and software displays on the display screen all characters to which that series of phonemes may apply. Unfortunately, because a great many characters do represent spoken words that sound the same, and Chinese is not a phonetic language, the operator must often select the desired character from a large number of characters displayed. There are approximately four hundred sounds in the spoken Chinese languages each with up to four. This limits the number of characters which can be used to approximately 500 or 1,000. In addition, while the form of Chinese characters is uniform throughout the Chinese-speaking world, the pronunciation may vary because of regional dialects, rendering the system unreliable for users other than speakers of dialects such as Mandarin for which suitable phonetic software is available. Furthermore, there are some Chinese characters which do not contain any phonemes, and so, such characters cannot be used in such a system.

United Kingdom Patents 2,066,534 and 2,118,749 disclose Chinese writing systems which employ fragments of strokes or "elements". Since Chinese characters are not formed by writing such elements in a particular order, a system of element entry cannot identify a Chinese character. It is the strokes, and more particularly the order of the strokes, that are written when forming a Chinese character, and the order is unvarying and known to all writers of Chinese. Even if a fixed element order is established, such a system leads to ambiguities because of the relatively large number of characters that might have the same element sequence, whereas the number of Chinese characters having the same stroke order is relatively small. Chinese characters with the same stroke order might be considered equivalent to homonyms in the English language, and of the 13,056 commonly used Chinese characters, only three hundred and twenty may be classed as homonyms, including twenty seven examples where there are three characters with the same stroke sequence and five examples where there are four characters with the same stroke sequence.

United Kingdom Patent 2,116,341 uses the 214 radicals and the number of strokes in a character to identify such a character. This system is prone to the difficulties that not all Chinese characters can be represented, and the system requires skill above and beyond that of the normal writer of Chinese.

United Kingdom Patent 2,125,197 discloses a method of encoding Chinese characters which entails dissembling each character into four constituent components, each representing a sound. With the large number of Chinese dialects, and the differences in pronunciation from one dialect to another, this method cannot be universally applied by any writer of Chinese. Australian Patent 532,185 discloses a keyboard using the well known "Ping" method of Chinese character index notation, which groups components of Chinese characters substantially in accordance with the nature of the first stroke of each component. This method has the disadvantage of requiring a very large keyboard with a very large number of keys, making the method difficult to implement.

United Kingdom Patent 2,062,916 discloses an automated method of Chinese character production using shape identifiers for the four corners of the basically square Chinese character. Such a system has to overcome the great difficulty of the large number of characters with similar shape elements, and is not practical in use.

United Kingdom Patent 2,060,231 makes use of a system of radicals, or "roots", numbering 256, but cannot represent a large number of Chinese characters, and has to accommodate the problem of selecting the desired character from a large number of characters containing a limited number of roots.

U.S. Pat. No. 4,684,926 discloses a method of depicting Chinese characters using 5 elements, or "strokes". The "strokes" of that invention do not represent the strokes normally applied in making up a Chinese character, and so character definition is made difficult. The "strokes" are described as a "topological pattern", and represents an entirely contrived system of Chinese writing taking no recognition of the traditional form of creating Chinese characters. Such a system requires the writer of Chinese to learn a new system of writing.

U.S. Pat. No. 4,500,872 discloses a system of Chinese writing using phonemes, and such a method cannot be universally applied by writers of Chinese because of the many varied differences in pronunciation, and furthermore, the very limited number of Chinese characters which contain any phonetic content. Chinese is not a phonetic language.

SUMMARY OF THE INVENTION

It is an object of the present invention to alleviate the above disadvantages and to provide a symbol definition apparatus which will be reliable and efficient in use. Other objects and advantages of this invention will hereinafter become apparent.

With the foregoing and other objects in view, this invention in one aspect resides broadly in character definition apparatus for an electronic information processing apparatus, said character definition apparatus including:
- character indicia entry means for the electronic information processing apparatus;
- character indicia data storage means; and
- character identification means for identifying characters according to the indicia content thereof.

The character may be any desired character or symbol, including a pattern or a logo. Preferably, however, the character is a symbolic language character and the indicia are the strokes from which a symbolic language character is formed. Of course, if desired, the character may be a symbol according to a language such as Chinese, Japanese, Korean, Vietnamese or a scientific symbol such as a component of a mathematical equation, or non-spoken language such as music manuscript.

The character identification means may include any desired identification criteria. It is preferred, however, that the character identification means include the stroke order in which strokes are added to form a character, and may also include stroke sequence data according to writing guidelines. The character indicia entry means may be adapted for the provision of sequential stroke order data corresponding to stroke size and shape data or by other stroke order definition means. The character indicia entry means may be further adapted for the provision of new character definition means whereby new characters may be entered into the character storage means.

The character identification means may also include apparatus for identifying characters according to their indicia count number. The indicia count number may be entered through indicia count entry means such as a numeric keypad, and may be utilised as the complete character identification means for characters having a unique indicia count, or as part of an identification strategy including indicia order data, in which case the desired character may be identifiable using less indicia order data than is necessary without the use of indicia count data. The character identification means may include provision for designating selected character indicia as unknown indicia or "wildcards" such that characters which are imperfectly known may be entered. Preferably, the character identification means has a character selection means whereby a plurality of characters are presented as selectable characters to the user interface for selection by the user, said selectable characters being selected from a character storage means according to a predetermined selection criterion.

Preferably, the selection criterion for selecting such a plurality of selectable characters is based upon the frequency of occurrence of characters in the written language that such characters represent related to the initial keystrokes entered identifying a first portion of a complete keystroke sequence common to one or a plurality of such characters. Preferably, the selection means uses a tree-structured search criterion whereby memory offset addresses of the most commonly used characters are used such that the entry of one keystroke for a character indicium may present a plurality of selectable characters most frequently used in redacting the symbolic character language, any one of which may be selected for entry, a second keystroke may either select any one of said selectable characters or select a second character indicium which may present a further plurality of selectable characters, any one of which may be used in a document, and so on for subsequent keystroke entries. Of course, the selection means may provide for a rejection means whereby indicia sequences which do not form characters in the vocabulary of the symbolic language cannot be entered.

The character indicia entry means may include moveable digitising means such as a "light pen", "touch screen", a "mouse" or a digitising pad or the like, and the digitising means may be used for the selection of indicia or characters displayed on a display means such as a video screen, or for defining the shapes of the strokes or the characters, or through any user interface. Of course the display means may also include cathode ray tubes, liquid crystal displays, neon or fluorescent arrays and the like.

It is preferred that the character indicia entry means include a plurality of entry means elements such as keyboard keys, and that each character indicium be associated with a respective entry means whereby selected character indicia may be input through the character indicia entry means in a manner analogous to typing the letters of an alphabetic word.

The keyboard keys may be arranged in any desired configuration, such as a double-arc configuration adapted for convenient simultaneous engagement with the tips of the fingers. In an alternative embodiment, the keyboard keys are arranged ergonomically in a pair of key groups of adjacent keys disposed remote from one another whereby each key group may be conveniently operated by the fingertips of one hand. Supplementary data entry keys may be disposed about and between the key groups, and may include data entry keys for the entry of alphanumeric data, numeric keys for entering numbers such as indicia counts, and control keys for controlling the display or the functions of the information processing apparatus.

The electronic information processing apparatus may take any desired form. For instance, it may be in the form of, or programmed for a word processor or the like, or may be adapted for providing information relating to characters entered into the processing apparatus for educational purposes, or for reference purposes such as a dictionary. Suitably, the processing apparatus may be formed as a compact portable "electronic dictionary" such that a user may be provided with a convenient source of reference data, or as an aid to teaching. Alternatively, the electronic information processing apparatus may be in the form of, or be programmed for a spreadsheet, accounting system, database, symbolic instruction code generator, command line processor, graphic user interface or entertainment system interface.

In another aspect of this invention, computer processing apparatus is disclosed for assembling text in Chinese language characters, said computer processing apparatus including:
  a memory comprising:
    stroke data storage elements which store data relevant to the character stroke content and character stroke order of respective Chinese characters, and
    complementary graphic data storage elements which store data relevant to the graphic representation of each said Chinese character;
  a keyboard having a plurality of Chinese character stroke entry keys corresponding to respective ones of fundamental Chinese character strokes;
  a searching program which is initiated through entering search criteria based on the fundamental Chinese character strokes and character stroke order for the desired Chinese character through said keyboard, said searching program being adapted for searching said stroke data storage elements according to said search criteria and for retrieving from the corresponding graphic data storage elements those Chinese character representations which meet said search criteria, and
  a visual display unit for displaying and compiling selected ones of the retrieved characters and assembling text in Chinese language characters.

In a further aspect, this invention resides in a method of entering symbolic characters into an electronic processing apparatus, said method including: providing character definition apparatus having symbolic character indicia entry means for the electronic information processing apparatus, character indicia data storage means and character identification means for identifying characters according to the character indicia content and order thereof; and operating said character indicia entry means for entry of the character indicia forming a character in the indicia order defined by standard practice.

Preferably, the tree-structured search criterion of memory offset addresses of symbolic characters may also be drawn upon in providing symbolic language messages by way of command line prompts, user menus, "pop-up" help screens, general user interface responses and the like.

The method may further include subdividing the character set into character data segments according to character indicia count number and using an entered indicia count number for access to the desired one of said character data segments, whereby the proportion of the total character set which must be searched by the entry of character indicia content and order may be minimised, and whereby the number of character indicia which must be entered before a unique character definition is achieved may be minimised. The method may yet further include new character definition whereby the vocabulary or character set of available symbolic characters may be increased.

In order that this invention may be more easily understood and put into practical effect, reference will now be made to the accompanying drawings which illustrate a preferred embodiment of the invention.

BRIEF DESCRIPTION OF THE DRAWINGS

FIG. 1 is a diagram of the indicium number allocations made to the eight basic character indicia from which Chinese characters are formed;

FIG. 4 is a diagram of a data-entry criterion for the Japanese syllabic writing Hiragana and Katakana according to a further embodiment of the invention;

FIG. 5A shows further detail of the displays of FIG. 5;

DETAILED DESCRIPTION OF THE PREFERRED EMBODIMENT

Figure 1A:
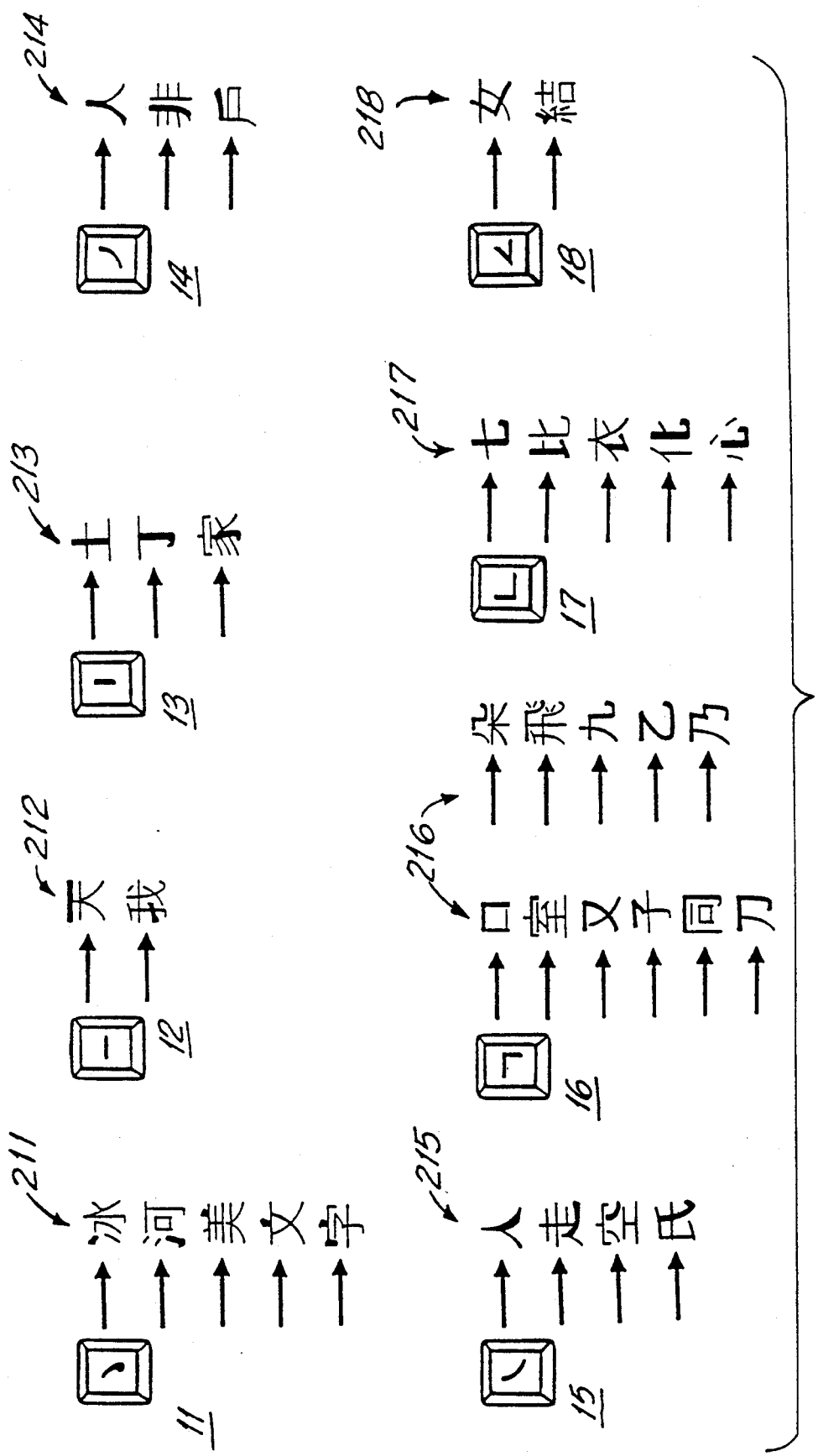
FIG. 1A is a diagram of the indicium number allocations shown in FIG. 1 with some examples of Chinese characters containing each respective indicium.

As illustrated in FIG. 1, the eight basic character indicia 11 through 18 which are used in the formation of Chinese characters have been allocated selected indicium numbers wherein:

indicium 11 represents the brush stroke dien,
indicium 12 represents the brush stroke heng,
indicium 13 represents the brush stroke su,
indicium 14 represents the brush stroke pyê,
indicium 15 represents the brush stroke nà,
indicium 16 represents the brush stroke heng jie,
indicium 17 represents the brush stroke su jie and
indicium 18 represents the brush stroke pyê jie.

Figure 2:
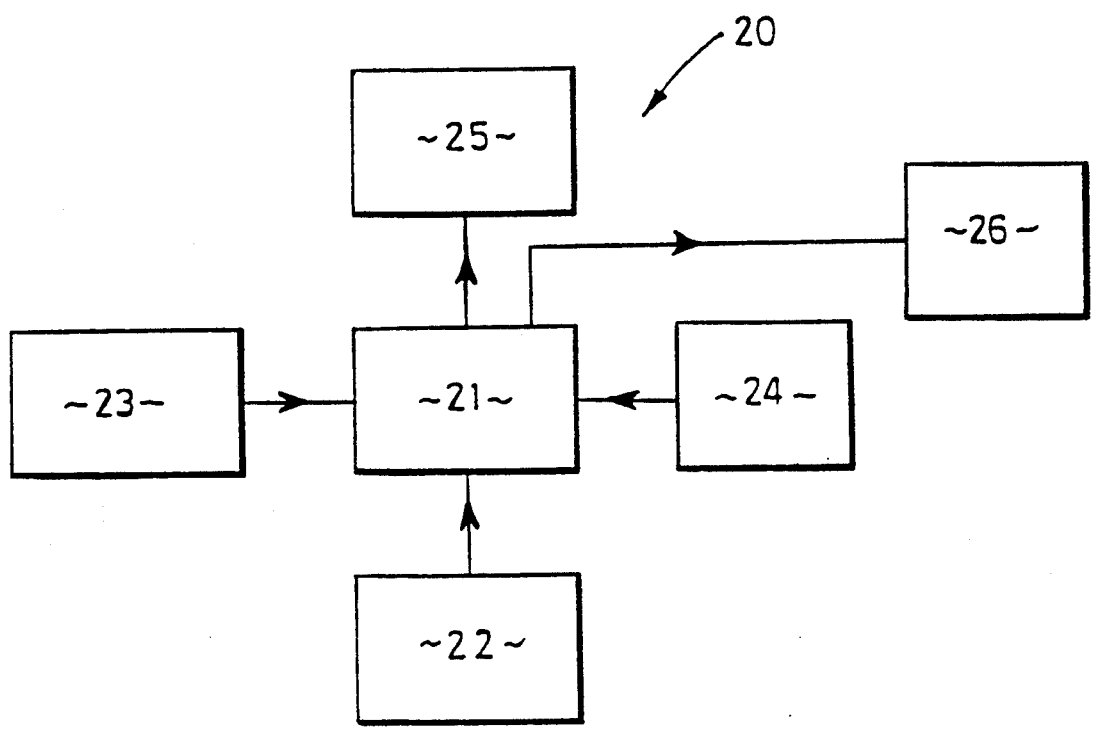
FIG. 2 is a block diagram of an electronic processing apparatus according to the invention.

The aforesaid indicium numbers are utilised by the electronic processing apparatus 20 shown in FIG. 2 as numerical reference codes for storage and retrieval of character data.

It is to be understood that the indicium numbers do not represent fixed shapes, but rather are derived from the actions of a human hand holding a paintbrush which over the history of the Chinese language have become standard practice in writing Chinese characters.

Referring to FIG. 1A, the character column 211 contains a sample of characters containing the indicium dien 11 which may be described as a dot. In making indicium dien 11, the tips of a brush would not be dragged across a page for any substantial distance. The indicium dien 11 may be described as a dot, or any stroke with limited extent.

Character column 212 contains a sample of characters containing indicium heng 12 which may be described as a horizontal stroke from left to right. The indicium heng 12 may be described as a horizontal stroke, or any stroke which is drawn from left to right.

Character column 213 contains a sample of characters containing indicium su 13 which may be described as a substantially downwards stroke, or a single brush stroke which commences with a substantially downwards stroke. The indicium su 13 may be described as a vertical stroke, or any stroke which is substantially vertical.

Character column 214 contains a sample of characters containing indicium pyê 14 which may be described as a stroke from right to left with a tendency downwards. The indicium pyê 14 may be described as a left sloping stroke, or any stroke which starts by going down the page and to the left.

Character column 215 contains a sample of characters containing indicium nà 15 which may be described as a stroke which at least commences downwards and from left to right. The indicium nà 15 may be described as a right sloping stroke, or any stroke which starts by going down the page and to the right.

The sample of characters in character columns 216 contain indicium heng jie 16 which may be described as a substantially horizontal stroke from left to right followed by a downwards substantially vertical stroke. In making indicium heng jie 16, the tips of the brush would not be lifted from a page when changing direction from the horizontal part of the stroke to the vertical part of the stroke. The indicium heng jie 16 may be described as a horizontal angle stroke, or any stroke having an angle and beginning with a left to right horizontal stroke.

Character column 217 contains a sample of characters containing indicium su jie 17 which may be described as a downwards substantially vertical stroke followed by a substantially horizontal stroke from left to right. In making indicium su jie 17, the tips of the brush would not be lifted from a page when changing direction from the vertical part of the stroke to the horizontal part of the stroke. The indicium su jie 17 may be described as a vertical angle stroke, or any stroke having an angle and beginning with a vertical stroke.

The Character column 218 contains a sample of characters containing indicium pyê jie which may be described as a stroke from right to left with a tendency downwards followed by a stroke from left to right. As with indicia heng jie 16 and su jie 17, in making indicium pyê jie 18, the tips of the brush would not be lifted from a page when changing direction from the first part to the second part of the stroke. The indicium pyê jie 18 may be described as a left sloping angle stroke, or any stroke having an angle and beginning with a left sloping stroke.

The electronic processing apparatus 20 shown in FIG. 2 has a central processing unit 21 to which are connected a keyboard 22, a program storage unit 23 and a character storage unit 24. A visual display unit 25 for displaying the retrieved characters and a printer 26 for printing the characters are also connected to the central processing unit 21.

The character information stored in the character storage unit 24 includes the indicium numbers 11 through 18 allocated to the various indicia along with indicia order data, such as the storage sequence of the indicium numbers within the character information, together with the indicia count number and character shape data for that character.

Figure 3:
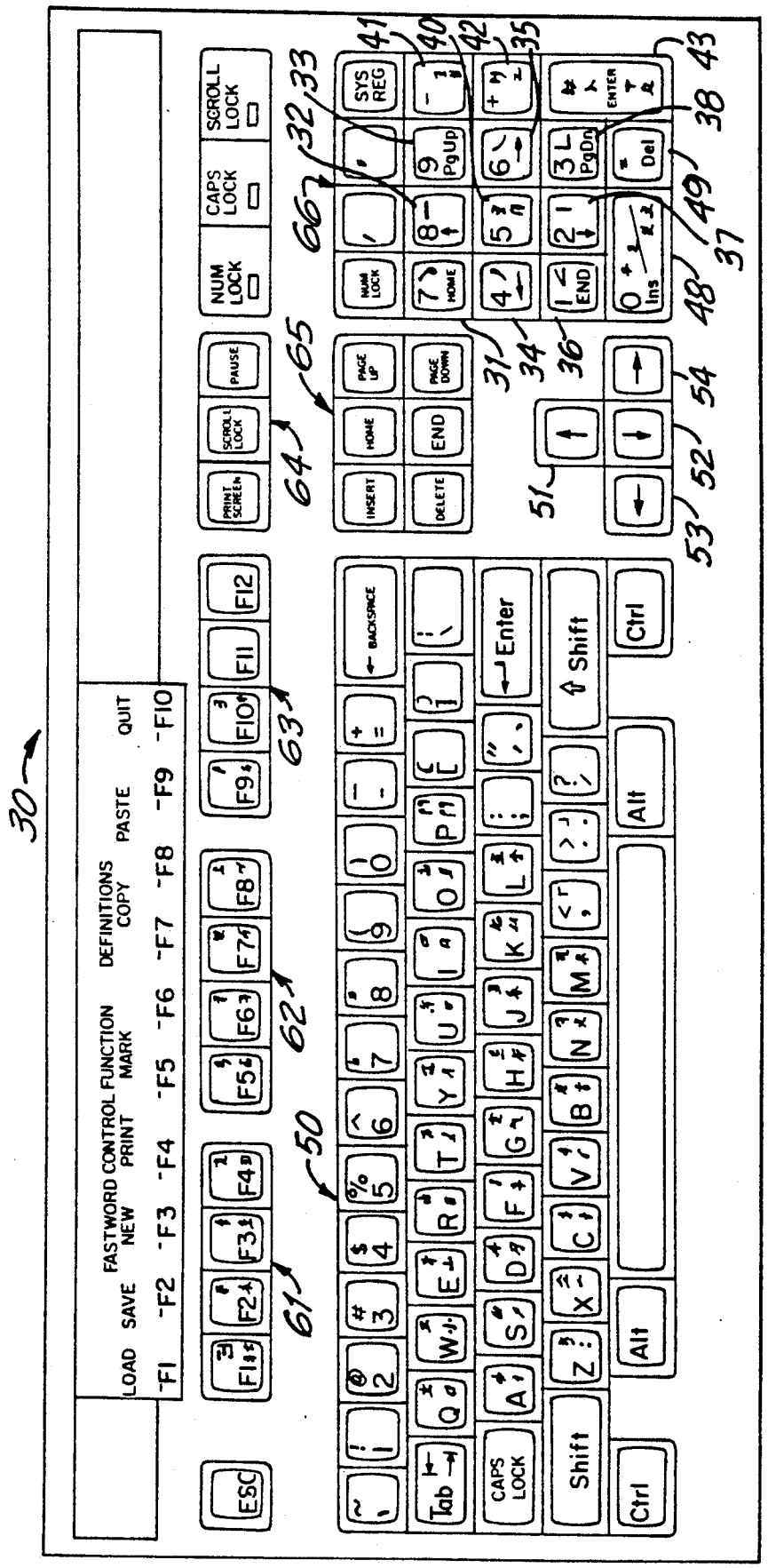
FIG. 3 is a diagram of a typical keyboard according one embodiment of the invention.

A preferred embodiment of the keyboard 22 of FIG. 2 is shown in FIG. 3 which has eight indicia entry keys 31 to 38 corresponding to the basic character indicia 11 to 18 respectively, wherein:

key 31 represents the brush stroke dien,
key 32 represents the brush stroke heng,
key 33 represents the brush stroke su,
key 34 represents the brush stroke pyê,
key 35 represents the brush stroke nà,
key 36 represents the brush stroke heng jie,
key 37 represents the brush stroke su jie and
key 38 represents the brush stroke pyê jie.

The indicia entry keys 31 to 38 are grouped around key 40, while the function keys 41 to 43 are disposed to the right of the indicia entry keys, and function keys 48 and 49 are blow the indicia entry keys. Character selection keys 51 to 54 are disposed in a group to the left of indicia entry keys 31 to 38 and function keys 41 to 43, 48 and 49. The indicia entry keys 31 to 38 and the function keys 40 to 43, 48 and 49 are grouped into ideograph entry portion 66 on keyboard 30.

Keyboard 30 also has keys grouped to the left of the indicia entry and function keys in a standard QWERTY arrangement 50, and each key in the group 50 is suitably programmed for commonly used words or phrases.

Further key groups 61 to 65 are disposed above and to the right of QWERTY portion 50. The keyboard shown in FIG. 3 has a layout similar to that of one of the standard English-language keyboards, and is configured such that it may be utilised accordingly. Some of the keys of QWERTY group 50 are marked with elements which are frequently used as the initial strokes in the formation of some Chinese characters. Such elements may be used for automatic stroke entry of the strokes making up the element, which may become a radical if the element is to be the main part of a Chinese character, and the element can be built upon to form a desired Chinese character.

The indicia entry and function keys portion of the keyboard 30 is adapted for operation in two modes—a word-processing mode in which keys function keys 41 to 43, 48 and 49 and key groups 61 to 65 perform standard word-processing functions, and a search mode in which the indicia entry keys 31 to 38 perform character selection functions according to a selection criterion and the function keys 41 to 43, 48 and 49 perform character entry functions.

Figure 5:
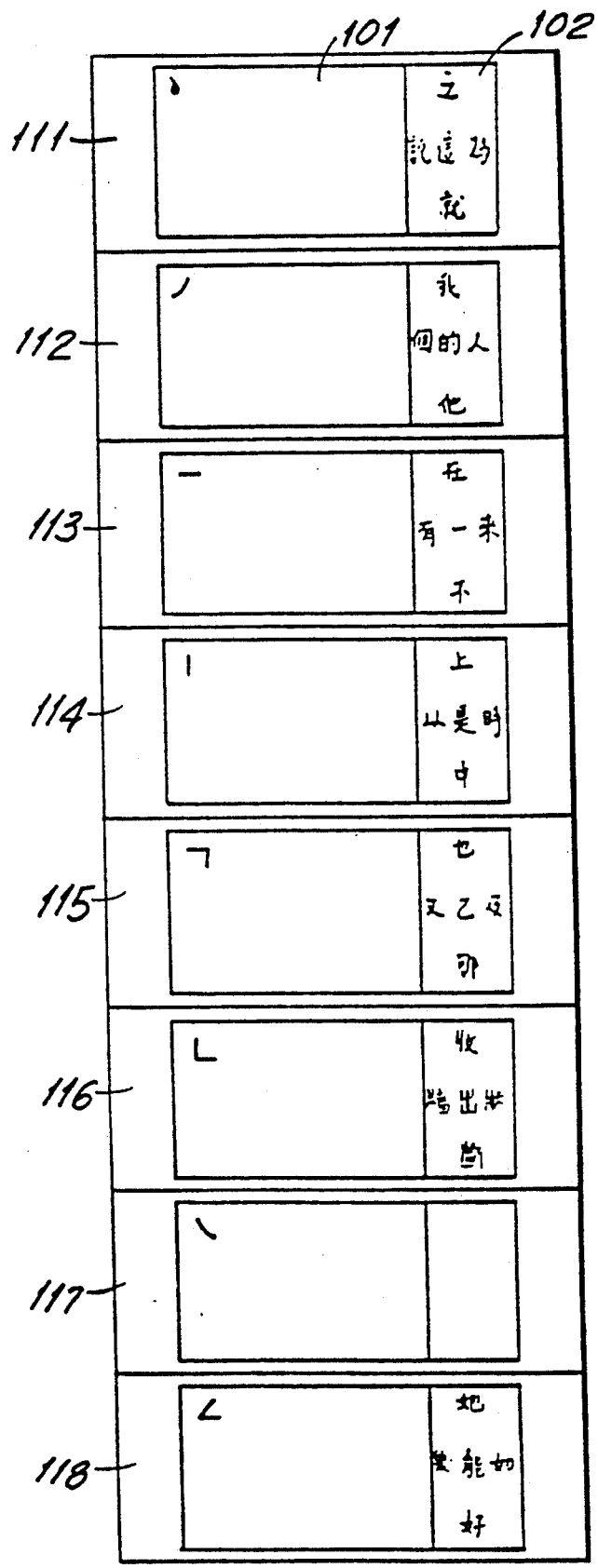
FIG. 5 is a diagram of a series of screen displays for a computer programmed according to another embodiment of the invention.

In use, the striking of, for example, indicium key 31 is transmitted to central processing unit 21 which draws from program storage unit 23 one or a plurality of selected characters from character storage unit 24 according to a programmed selection criterion and displays the or each selected characters upon display unit 25. Referring to FIG. 5, the striking of indicium key 31, for example, would display screen display 111 on at least part of display unit 25.

The user may then either strike a further one of character indicia keys 31 to 38 which may present the user with a further one or a plurality of selected characters from the character storage means 25 according to the programmed selection criterion on display unit 25, or alternatively the user may strike any one of the character selection keys 51 to 54 or the enter key 43 to select the character for entry into central processing unit 21. The function key 40 is a character repeat key. In a preferred embodiment, the program stored in the program storage unit 23 when instructing the central processing unit 21 would display at least some of the plurality of selected characters upon the display unit 25 as a quincunx of the five most frequently redacted ideographs, the most frequently redacted character in the centre thereof and the second to fifth such characters at the corners thereof.

Striking the enter key 43 causes the central (most frequently redacted) character to be entered into the central processing unit 21, and striking one of the character selection keys 51 to 54 causes one of the corner characters corresponding to the arrow depicted on each key to be entered into the central processing unit 21. Alternatively, striking a further indicium key causes a new set of one to five characters to be presented to the user. The new set, of course, may be the same as the previous set if the user strikes the appropriate indicium selection key being in the same sequence of the most frequently redacted character in any one of the characters in the quincunx already.

Program storage unit 23 may be programmed or contain a set of machine instructions such that when the search mode is initiated, the processing unit 21 flags all characters in the character storage unit 24. In the search mode, pressing one of the indicia entry keys 31 to 38 will initiate a search of the character storage unit 24 which will unflag all characters which do not begin with that indicium. A selection of the flagged characters may be displayed on display unit 25.

When a second operation of one of the indicia entry keys 31 to 38 is made, a search is initiated of all remaining flagged characters, and characters not containing the two character indicia in the same order as they were entered are unflagged. Further character indicia may be defined by further entries via the indicia entry keys 31 to 38, and each time a new character indicium is defined, the remaining flagged characters which do not include the indicia in the entered order are unflagged.

The process may continue until only one character remains flagged, and this character may then be displayed on the visual display unit 25 for acceptance or rejection by the user. Alternatively, the processing unit 21 may be programmed to display all flagged characters when only a small number remain. The operator may then select the correct character by pressing the appropriate one of the keys in the function key groups 40 and 41. Selection of an indicium which leads to a sequence of indicia which do not form a character in the vocabulary of the symbolic language warns the user that such a sequence of indicia is not available in the redaction process for the symbolic language. Furthermore, keyboard 22 may have a delete, rub-out, or backspace key which deselects the last indicium entry.

The preferred embodiment may also provide for the insertion of indicia into a set of selected indicia to present the user with characters according to the selection criterion for the newly defined indicium sequence.

Referring to FIG. 5, striking of any one of the indicium selection keys 31 to 38 on keyboard 30 causes the respective one of screen displays 111 to 118 on display unit 25. The screen display is preferably displayed on a portion of the screen of display unit 25 and the remainder of the screen preferably displays the Chinese characters already selected to produce a written Chinese document. Each screen display 111 to 118 is divided into two portions as shown in screen display 111. A stroke sequence display 101 is to the left of a character selection display 102. Striking of indicium selection keys 31 to 38 in a particular sequence causes the sequence so selected to be displayed within the stroke sequence display 101. As the sequence so selected is entered via keyboard 30, new sets of characters appear in character selection display 102 according to the accepted first portion of strokes in the sequence so selected. Preferably, the five most frequently redacted Chinese characters are displayed in a quincunx disposition as shown in the example of a character selection display 102. Preferably, the most frequently redacted character is in the centre of the quincunx. Of course, if there are less than five characters according to the selected sequence, then less than five characters are displayed in the character selection display 102, and if there are no characters in the character storage unit 24 according to the selected sequence, the central processing unit preferably makes an audible alarm sound.

Figure 11:
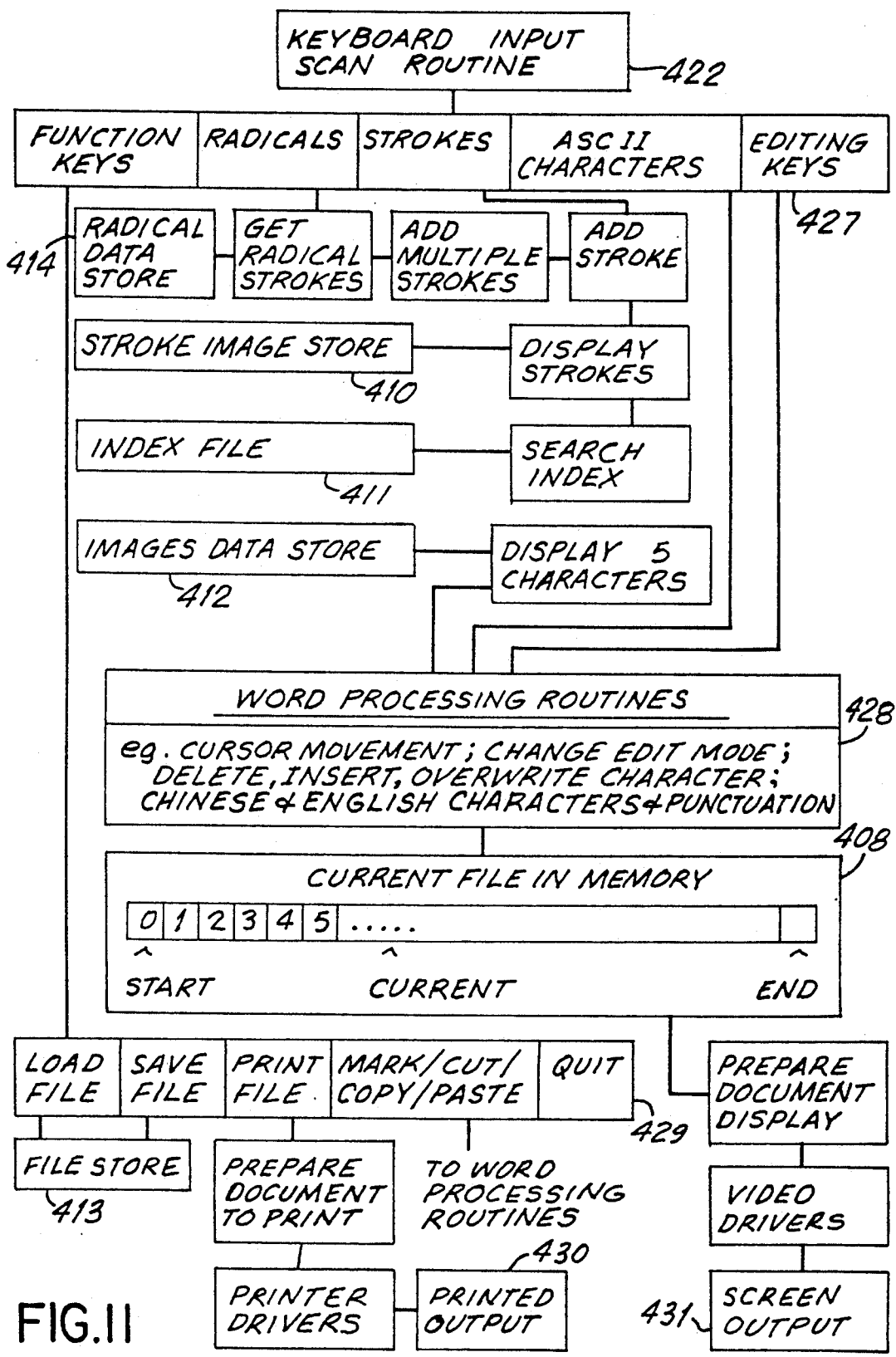
FIG. 11 is a block diagram of the relevant portions of a computer program for an electronic apparatus according to a further embodiment of the invention.

Referring now to FIG. 11, which shows a block diagram of the relevant portions of a computer program for an electronic apparatus according to one embodiment of the invention, keyboard input scan routine 422 accepts scan codes from keyboard 22 and processes them in input scan routine processor 427 which contains a multiple branch for the type of key depressed by an operator. The branches within input scan routine processor 427 are for function keys, radicals, strokes, ASCII characters and editing keys. Preferably, the QWERTY keys 50 of a keyboard 30 as shown in FIG. 3 are used as Chinese radicals, or alternatively for ASCII characters in another editing mode. In radical entry editing mode, for example, striking a radical key in the QWERTY portion of keyboard 30 directs the input scan routine processor 427 to get radical strokes from radical data store 414, add the radical strokes to the character, retrieve strokes from stroke image store 410, search the index of Chinese characters in index file 411, retrieve the appropriate images of Chinese characters images data store 412, and display up to five Chinese characters on a screen display of the type depicted in FIGS. 5 and 5A. Upon striking the enter key 43, or one of the arrow keys 51 to 54, the selected character is passed to the word processing routines 428 and the character is added to the current position of the current file in memory 408. The current file in memory 408 is prepared for display, passed through the appropriate video drivers for screen output 431. The striking of a stroke key in input scan routine processor 427 bypasses the routine for the radical entry route, and retrieves the stroke from stroke image store 410, searches the index of Chinese characters in index file 411, retrieves the appropriate images of Chinese characters images data store 412, and displays up to five Chinese characters on a screen display of the type depicted in FIGS. 5 and 5A. Upon striking the enter key 43, or one of the arrow keys 51 to 54, the selected character is passed to the word processing routines 428 and the character is added to the current position of the current file in memory 408. The current file in memory is prepared for display, passed through the appropriate video drivers for screen output 431. ASCII characters, which are preferably depicted as letters of the English alphabet are entered directly into the word processing routines 428 by striking one of the QWERTY keys 50 of keyboard 30 in the English language mode.

Striking one of the editing keys in input scan routine processor 427 passes the program directly to one of the word processing routines 428 such as cursor movement, change edit mode, delete, insert or overwrite a character, as well as Chinese and English characters and punctuation.

Upon receipt of a scan code for one of the function keys in input scan routine processor 427, the program is passed to the function key processor 429 which has program routines for loading and saving Chinese documents from file store 413, printing a file from file store 413 or the current file in memory 408 as printed output 430, block functions commonly available in alphabetical word processors such as mark, cut, copy and paste sections of a document, or to quit from the program. It is to be understood that input scan routine processor 427, word processing routines 428 and function key processor 429 may be adapted to perform functions for other electronic data processing applications such as, but not limited to a spreadsheet, accounting system, database, symbolic instruction code generator, command line processor, graphic user interface or entertainment system interface.

In use, a digital electronic apparatus may be programmed to render the Chinese language into written form. A literary work may written in Chinese using Chinese characters, and thus make available to a Chinese writer the standard features available to users of electronic word processors for alphabetic languages. Alternatively, the method of this invention may be applied to a mechanical device such as a compositor, or an electromechanical device for the same purpose.

Figure 6:
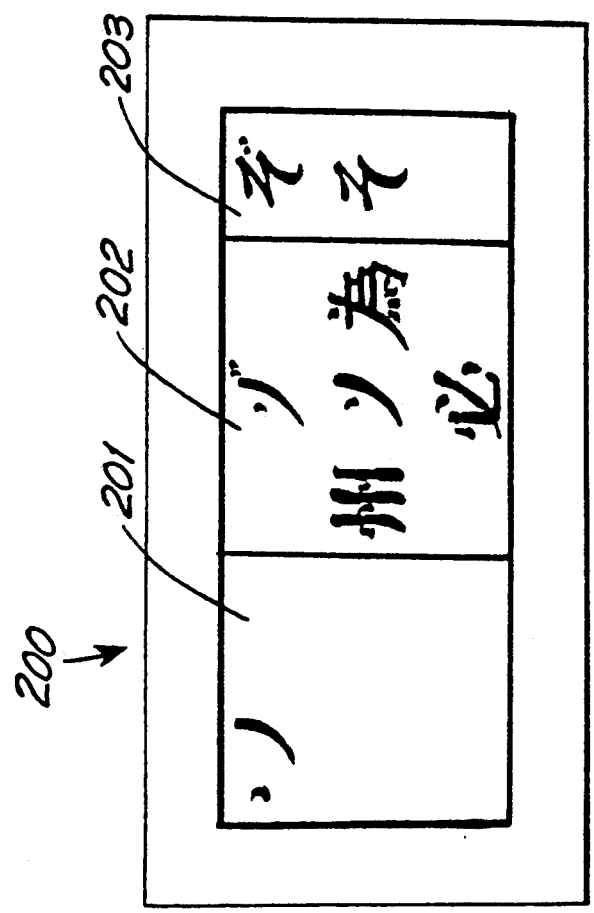
FIG. 6 is a diagram of a screen display for a computer programmed according to an alternative embodiment of the invention.

In an alternative embodiment, and referring to FIG. 4 and FIG. 6, Japanese katakana characters in columns 70 to 79 and Japanese hiragana characters in columns 80 to 89 may be made available to the user according to the selection criterion hereinbefore described whereby katakana characters are presented to the user in the manner hereinbefore described and corresponding hiragana characters may also be displayed on display unit 25 and selected by striking functions keys 41 or 42, or alternatively, since katakana characters always form part of a Chinese or kanji character, striking an indicium selection key continues to present Chinese or kanji characters to the user as well as katakana characters if such are represented by the character selection criterion. In a preferred form, the function key 40 may be used to select modifiers for katakana, hiragana or kanji characters to accommodate the practice of adding such modifiers in the Japanese language.

The striking of an indicium entry key 31 to 38 would cause the screen display 200 to be displayed on at least a portion of display unit 25. The screen display 200 preferably has a stroke sequence display 201 and to the right thereof a katakana and kanji character selection display 202 and to the right thereof a hiragana character selection display 203. Of course, the hiragana character display will have hiragana characters corresponding to the katakana characters as shown in FIG. 4 when such katakana characters are displayed in character display 202. Preferably, the characters displayed in katakana and kanji display 202 are the five most frequently redacted characters from both katakana and kanji when Japanese is written, and the centre character is the most frequent and the character above the second most frequent. Of course, when the first and second most frequently redacted characters are katakana, there will be two hiragana characters in the character display 203.

The katakana or kanji character may be selected out of character display 202 by striking the appropriate one of keys 43 or 51 to 54, or alternatively, a hiragana may be selected from character display 203 by striking key 42 for the lower hiragana character or key 41 for the upper hiragana character.

Figure 7:
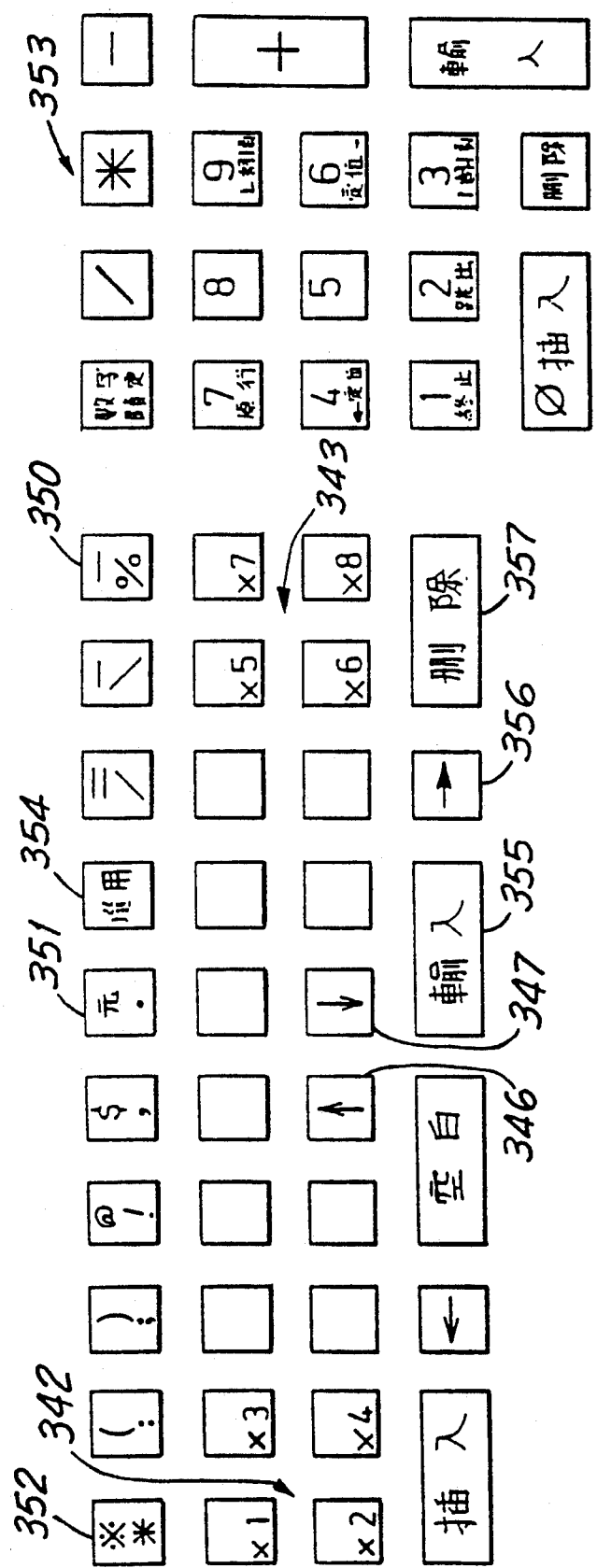
FIG. 7 is a diagram of a keyboard in word processing mode for an electronic apparatus according to a further embodiment of the invention.
Figure 8:
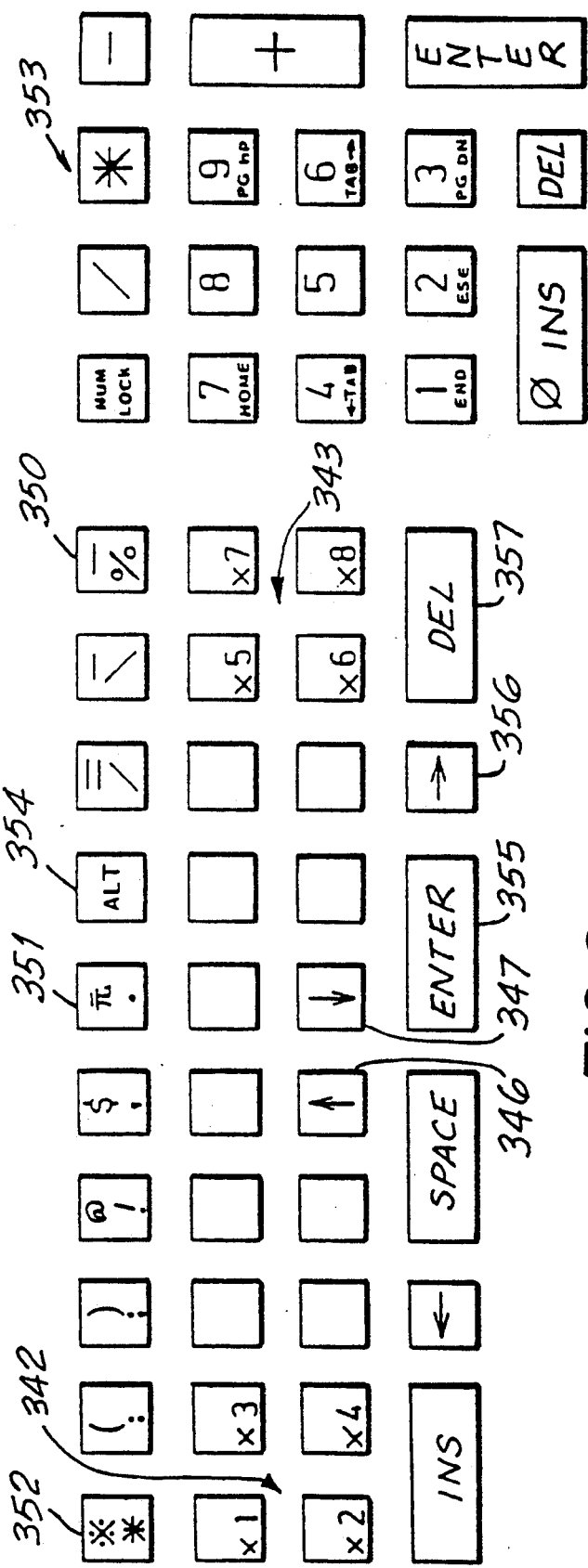
FIG. 8 shows alternative detail of the keyboard of FIG. 7.
Figure 9:
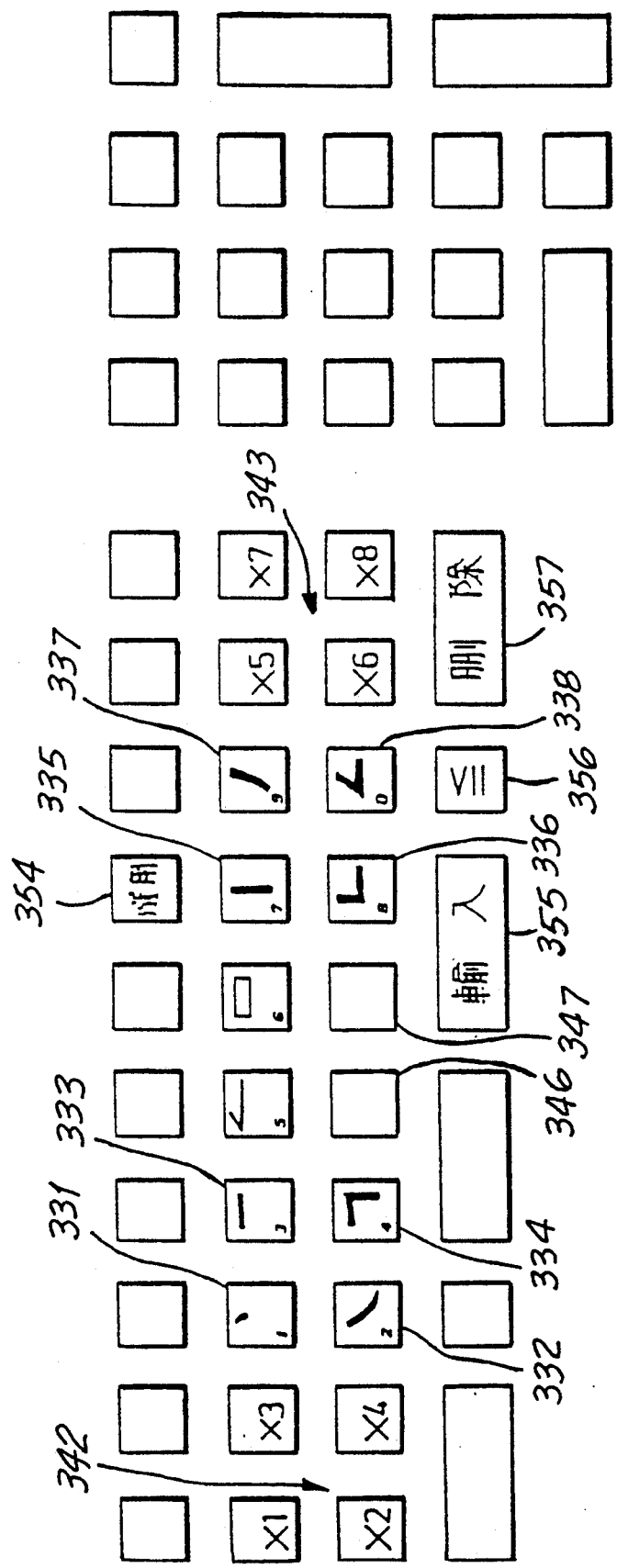
FIG. 9 is a diagram of a keyboard in character search mode for an electronic apparatus according to the further embodiment of the invention in FIGS. 7 and 8.
Figure 10:
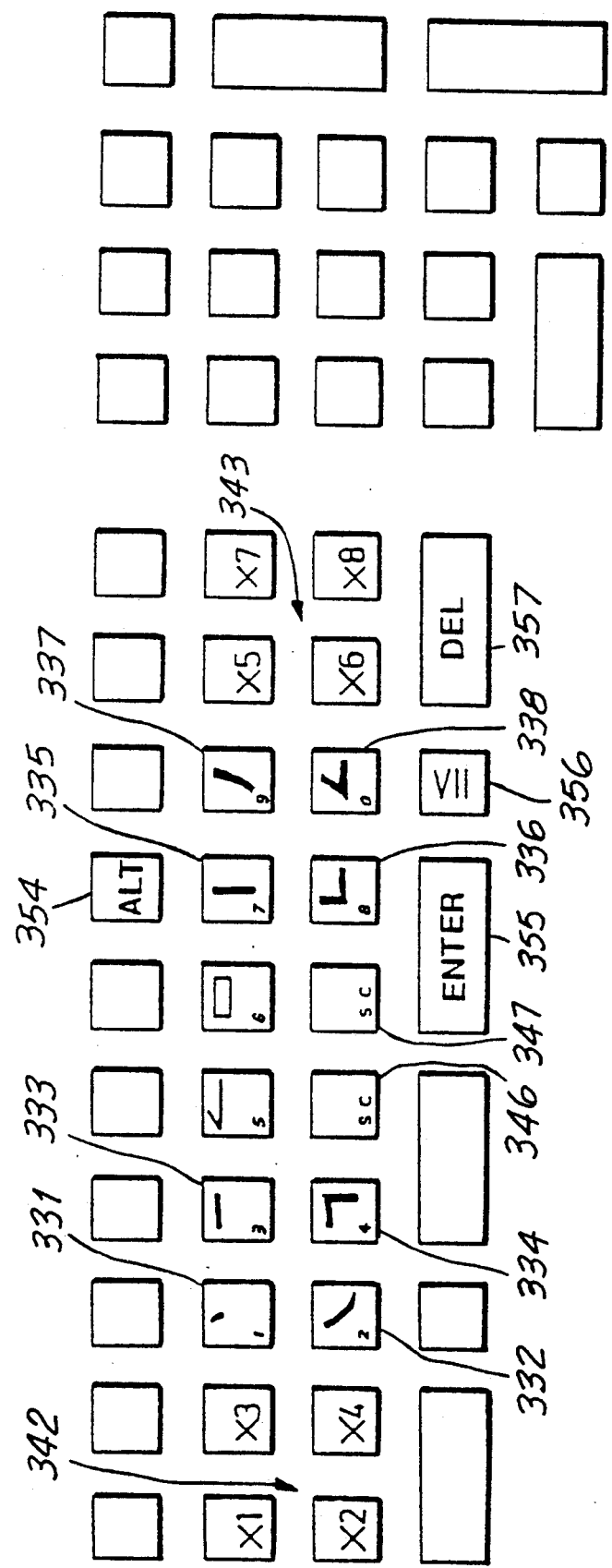
FIG. 10 shows an alternative detail of the keyboard of FIG. 9.

In an alternative embodiment, the keyboard 330 shown in FIGS. 7 and 10 has eight stroke entry keys 331 to 338 corresponding to the basic character strokes 11 to 18 respectively. The stroke entry keys 331 to 334 are grouped in a left-hand key group 340, while the stroke entry keys 335 to 338 are grouped in a right-hand key group 341. Function key groups 342 and 343 are disposed to the left of the left-hand key group 340 and to the right of the right-hand key group 341 respectively, while a back-space key 44, a "wildcard" key 345 and a pair of up-down arrow keys 346 and 347 occupy the space between the key groups 340 and 341.

An upper key row 350 includes keys for standard word-processing symbols, as well as the Chinese dollar symbol 351 and the Chinese character equivalent to "note well" 352. A standard numeric keypad assembly 353 is included at the extreme right-hand side of the keyboard 330.

The keyboard 330 is adapted for operation in two modes—a word-processing mode in which all keys other than the stroke entry keys 331 to 338 and the function keys 344 and 345 are active, and a search mode in which only the stroke entry keys 331 to 338, the function keys 342, 343, 344, and 345, the "alternate" key 354, the "enter" key 355, the "less than or equal to" key 356 and the "delete" key 357 are active. In the latter mode, the arrow keys 346 and 347 become "stroke count keys".

The keyboard is placed in the search mode by pressing any one of the stroke entry keys 331 to 338, and shifts to the word-processing mode after the "enter" key 355 is pressed.

When the search mode is initiated, the processing unit 21 flags all characters in the character storage unit 24.

In the search mode, pressing one of the stroke entry keys 331 to 338 will initiate a search of the character storage unit 24 which will unflag all characters which do not begin with that stroke. When a second operation of one of the stroke entry keys 331 to 338 is made, a search is initiated of all remaining flagged characters, and characters not containing the two character strokes in the same order as they were entered are unflagged. Further character strokes may be defined by further entries via the stroke entry keys 331 to 338, and each time a new character stroke is defined, the remaining flagged characters which do not include the stroke in the entered order are unflagged.

The process may continue until only one character remains flagged, and this character may then be displayed on the visual display unit 25 for acceptance or rejection by the operator. Alternatively, the processing unit may be programmed to display all flagged characters when only a small number remain. The operator may then select the correct character by pressing the appropriate one of the keys in the function key groups 340 and 341.

If the wildcard key 345 is pressed, no unflagging occurs, but the processing unit advances to search the next stroke in each flagged character upon the next operation of one of the stroke entry keys 331 to 338.

If a stroke count key 346 or 347 is pressed, numeric keys followed by the enter key 355 may be pressed to enter the stroke count of the desired character. All characters not having this stroke count are then unflagged. If the "less than or equal to" key 356 is pressed after the numeric sequence instead of the "enter" key 355, all characters having a greater stroke count than the entered number are unflagged. Depending on the number of characters having a particular stroke count, entering the stroke count may reduce the necessity for entering strokes substantially. For instance, only one character has fifty-two strokes. Using the stroke count option in this case reduces the keystrokes required to uniquely define the character from fifty-two to three.

It will of course be realised that while the above has been given by way of illustrative example of this invention, all such and other modifications and variations thereto as would be apparent to persons skilled in the art are deemed to fall within the broad scope and ambit of this invention as is defined in the appended claims.

We claim:

1. Computer processing apparatus for assembling text in ideographic language characters, the computer processing apparatus comprising:
    a memory including character stroke data storage means which stores data relevant to ideographic character stroke-type categories wherein each category is characterized by a size of a character stroke in the category and a direction of forming the character stroke in the category when handwritten, data relating to ideographic characters, and data representative of the order in which character strokes of respective ideographic characters are hand-written, and graphic data storage means from which data relevant to the graphic representations of each said ideographic character may be retrieved;
    display means for displaying ideographic language characters retrieved from said graphic data storage means;
    entry means providing a plurality of input entry designations including character stroke-type category entry designations designated by indicating means indicative of respective ones of the ideographic character stroke-type categories, and
    selection means for selecting one of a plurality of characters displayed by said display means;
    wherein said character stroke data storage means is searched by entering through the input entry designations search criteria including the entered ideographic character stroke-type categories and the order in which the character stroke-type categories are entered through the input entry designations, whereby, upon entry of the search criteria, data relevant to a graphic representation of the ideographic character or data relevant to the graphic representations of a plurality of ideographic characters which meet the search criteria is retrieved from the graphic data storage means and at least one of the graphic representations displayed by the display means.

2. Computer processing apparatus as claimed in claim 1, wherein said character stroke data storage means stores data relevant to eight ideographic character stroke-type categories.

3. Computer processing apparatus as claimed in claim 1, wherein said ideographic characters are of Chinese language.

4. Computer processing apparatus as claimed in claim 1, wherein said character stroke data storage means stores data relevant to eight ideographic character stroke-type categories, one of said categories including character strokes characterized as being a small short character stroke in size and extending in any direction, and others of said categories being characterized as being larger than said small short character stroke in size and being formed when hand-written in at least one initial direction selected from the group consisting of left to right, left to right followed by any other direction, downwardly vertical, downwardly vertical followed by any other direction, downwardly left sloping, downwardly left sloping followed by any other direction, and downwardly right sloping.

5. Computer processing apparatus as claimed in claim 1, wherein said entry means is an input entry keyboard and said character stroke-type category entry designations are entry keys of said keyboard.

6. Computer processing apparatus as claimed in claim 5, wherein said keyboard includes keys arranged in a square grid pattern having three rows each being of three keys, and wherein eight peripheral keys of a grid are character stroke-type category entry keys.

7. Computer processing apparatus as claimed in claim 6, wherein said entry keys are arranged in a key group positioned on a portion of a standard keyboard.

8. Computer processing apparatus as claimed in claim 7, wherein there are provided supplementary entry keys disposed about said key group.

9. Computer processing apparatus as claimed in claim 5, wherein said keys are disposed in a spatial configuration similar to a quincunxial Greek cross of selectable characters displayed by the display means.

10. Computer processing apparatus as claimed in claim 1, wherein the most used ideographic character meeting said search criteria and a plurality of the next most used ideographic characters meeting said search criteria are identifiably displayed by said display means.

11. Computer processing apparatus as claimed in claim 10, wherein said selection means is operable to arrange a selected one of the displayed most used characters in a text being assembled.

12. Computer processing apparatus as claimed in claim 6, and further comprising warning means to warn of inputs of said character stroke-type category entry keys which satisfy the search criteria for the characters stored in said character stroke data storage means.

13. A method of assembling text in ideographic language characters by a computer processing apparatus including a memory including character stroke data storage means which stores data relevant to ideographic character stroke-type categories characterized by a size of a character stroke in the category and a direction of forming the character stroke in the category when hand-written, data relating to ideographic characters, and data representative of the order in which character strokes of respective ideographic characters are hand-written, and graphic data storage means from which data relevant to the graphic representations of each said ideographic character may be retrieved, display means for displaying ideographic language characters retrieved from said graphic data storage means, and entry means providing a plurality of input entry designations including character stroke-type category entry designations designated by indicating means indicative of respective ones of said ideographic character stroke-type categories, and selection means for selecting one of a plurality of characters displayed by said display means, the method comprising the steps of:

entering ideographic stroke-type categories through said input entry designations in the order in which categories strokes are written wherein said character stroke data storage means is searched by search criteria including the entered ideographic character stroke-type categories and the order in which the character stroke-type categories are entered through said input entry designations and data relevant to a graphic representation of an ideographic character or the data relevant to graphic representations of a plurality of the ideographic characters which meet said search criteria from the graphic data storage means are retrieved and displayed as at least one graphic representation by said display means; and operating said selection means to select one of said retrieved graphic representations of ideographic characters to arrange a selected one of the displayed most used characters in a text being assembled.

14. A method as claimed in claim 13, and further comprising the step of displaying the strokes entered into said computer processing apparatus.

15. A method as claimed in claim 13, and further including tree-structured search criteria for said character stroke data storage.

16. A method as claimed in claim 15, wherein said ideographic characters are of Chinese language.

17. A method as claimed in claim 16, further providing an electronic apparatus adapted to present a plurality of Chinese language characters on said display means.

18. A method as claimed in claim 16, and further comprising the step of displaying a plurality of the most frequently redacted Chinese language characters.

19. A method as claimed in claim 18, wherein a plurality of Chinese character indicia according to an indicia content of a selected set of elements of Chinese language characters is entered in said apparatus.

20. A method as claimed in claim 13, comprising the step of displaying a plurality of the most frequently redacted Japanese language characters.

* * * * *

UNITED STATES PATENT AND TRADEMARK OFFICE
CERTIFICATE OF CORRECTION

PATENT NO. : 5,187,480
DATED : Feb. 16, 1993
INVENTOR(S) : Ronald H. THOMAS and Helmut STOHR It is certified that error appears in the above-indentified patent and that said Letters Patent is hereby corrected as shown below:

On the title page, item [73] should be corrected as follows:

Assignee: Allan Garnham, Queensland, Australia, part interest

On the title page, insert item [63] as follows:

Related U.S. Application Data
    Continuation-in-part of International Application No. PCT/AU 89/00379, Sep. 5, 1989, abandoned.

Signed and Sealed this

Eighteenth Day of May, 1999

Attest:

Q. TODD DICKINSON

*Attesting Officer*  *Acting Commissioner of Patents and Trademarks*